(12) United States Patent
Johansson

(10) Patent No.: US 9,973,438 B2
(45) Date of Patent: May 15, 2018

(54) DOWNLINK FLOW MANAGEMENT

(71) Applicant: Telefonaktiebolaget LM Ericsson (publ), Stockholm (SE)

(72) Inventor: Ingemar Johansson, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 99 days.

(21) Appl. No.: 15/027,316

(22) PCT Filed: Oct. 7, 2013

(86) PCT No.: PCT/SE2013/051174
§ 371 (c)(1),
(2) Date: Apr. 5, 2016

(87) PCT Pub. No.: WO2015/053665
PCT Pub. Date: Apr. 16, 2015

(65) Prior Publication Data
US 2016/0248691 A1    Aug. 25, 2016

(51) Int. Cl.
*H04L 12/863* (2013.01)
*H04L 12/875* (2013.01)
(Continued)

(52) U.S. Cl.
CPC ........ *H04L 47/6225* (2013.01); *H04L 47/562* (2013.01); *H04L 47/58* (2013.01);
(Continued)

(58) Field of Classification Search
CPC ............... H04L 47/6225; H04L 47/622; H04L 47/6255; H04L 47/6285; H04L 47/629;
(Continued)

(56) References Cited

U.S. PATENT DOCUMENTS 6,026,230 A * 2/2000 Lin ............... G06F 17/5022
                                                    703/13
6,092,115 A * 7/2000 Choudhury ........ H04L 47/52
                                                    709/235

(Continued)

FOREIGN PATENT DOCUMENTS

EP    1330080 A2    7/2003
WO    2013125999 A1    8/2013

OTHER PUBLICATIONS

Ahmed, Shawish et al., "Fair Scheduling for Delay-Sensitive VoIP Traffic", IEICE Transactions on Communications, Communications Society, Tokyo, vol. E92B, No. 10, Oct. 10, 2009, 3115-3125.

(Continued)

*Primary Examiner* — Warner Wong
(74) *Attorney, Agent, or Firm* — Sage Patent Group

(57) ABSTRACT

A flow management method comprises receiving (210) of incoming downlink packets. The received downlink packets are classified (220) in sub-flows, based on information that is available in a header of respective such received downlink packet. The downlink packets of each sub-flow are queued (230) in a respective sub-flow queue. Downlink packets are extracted (250) from the sub-flow queues into a common outgoing flow. A sub-flow queue from which no downlink packets yet have been extracted is prioritized (240). The extraction comprises assigning of an indicator of last service occasion to each sub-flow queue when a predetermined amount of data has been extracted from said sub-flow queue. When no prioritized sub-flow queues are present, the sub-flow queue with the earliest last service is selected. When a prioritized sub-flow queue is present, the prioritized subflow queue is selected. The downlink packets of the common outgoing flow are sent (260).

16 Claims, 10 Drawing Sheets

(51) Int. Cl.
*H04L 12/869* (2013.01)
*H04L 29/06* (2006.01)
*H04W 72/04* (2009.01)

(52) U.S. Cl.
CPC ............ H04L 47/621 (2013.01); H04L 69/02 (2013.01); H04W 72/042 (2013.01); *H04L 47/6255* (2013.01); *H04L 47/6285* (2013.01); *H04L 47/6295* (2013.01)

(58) Field of Classification Search
CPC ................ H04L 47/6295; H04L 69/02; H04L 2012/5681; H04L 49/3018; H04L 49/3027; H04L 49/3036; H04L 49/90; H04L 49/9036; H04W 72/042
See application file for complete search history.

(56) References Cited

U.S. PATENT DOCUMENTS

| | | | | |
|---|---|---|---|---|
| 6,738,346 | B1* | 5/2004 | Prieto, Jr. | H04B 7/1858 370/229 |
| 6,757,897 | B1* | 6/2004 | Shi | G06F 9/4843 710/240 |
| 8,254,390 | B2* | 8/2012 | Hall | H04L 47/125 370/394 |
| 8,467,338 | B2* | 6/2013 | Lin | H04L 47/14 370/235 |
| 8,520,522 | B1* | 8/2013 | Goldman | H04L 47/26 370/235 |
| 8,797,865 | B2* | 8/2014 | Li | H04L 65/80 370/230.1 |
| 9,331,948 | B2* | 5/2016 | Venekataswami | H04L 47/24 |
| 2002/0188713 | A1* | 12/2002 | Bloch | H04L 29/12009 709/223 |
| 2003/0096597 | A1* | 5/2003 | Kar-Kin Au | H04L 47/14 455/412.1 |
| 2003/0112802 | A1 | 6/2003 | Ono et al. | |
| 2003/0133457 | A1* | 7/2003 | Ono | H04L 47/10 370/395.4 |
| 2003/0152083 | A1* | 8/2003 | Nagata | H04L 47/10 370/395.4 |
| 2004/0006662 | A1* | 1/2004 | Frank Chao | G06F 13/364 710/240 |
| 2004/0042460 | A1* | 3/2004 | Gruhl | H04L 47/10 370/395.4 |
| 2004/0081167 | A1* | 4/2004 | Hassan-Ali | H04L 12/5602 370/395.42 |
| 2004/0105393 | A1* | 6/2004 | Ronneke | H04L 45/00 370/252 |
| 2005/0013248 | A1* | 1/2005 | Mekkittikul | H04L 12/2852 370/232 |
| 2005/0249114 | A1* | 11/2005 | Mangin | H04W 72/10 370/229 |
| 2005/0249128 | A1* | 11/2005 | Mekkittikul | H04L 12/2852 370/252 |
| 2006/0126507 | A1* | 6/2006 | Nakayasu | H04L 47/10 370/229 |
| 2006/0146721 | A1* | 7/2006 | Attar | H04L 1/0002 370/238 |
| 2006/0146853 | A1* | 7/2006 | Paila | H04L 47/621 370/428 |
| 2006/0146875 | A1* | 7/2006 | Yang | H04L 47/10 370/468 |
| 2006/0176807 | A1* | 8/2006 | Wu | H04L 47/527 370/229 |
| 2007/0076679 | A1* | 4/2007 | Lee | H04W 28/18 370/348 |
| 2007/0133561 | A1 | 6/2007 | Nam et al. | |
| 2007/0291645 | A1 | 12/2007 | Ryu et al. | |
| 2009/0017836 | A1* | 1/2009 | Lee | H04W 72/1236 455/452.2 |
| 2010/0142514 | A1* | 6/2010 | Stein | H04L 12/66 370/352 |
| 2011/0188464 | A1* | 8/2011 | Shinohara | H04W 28/065 370/329 |
| 2011/0307233 | A1* | 12/2011 | Tseng | G06F 17/5022 703/14 |
| 2012/0039173 | A1* | 2/2012 | Danzig | H04L 12/2801 370/235.1 |
| 2013/0003545 | A1* | 1/2013 | Li | H04L 65/80 370/230.1 |
| 2013/0077501 | A1* | 3/2013 | Krishnaswamy | H04L 47/193 370/252 |
| 2014/0078985 | A1* | 3/2014 | Kanamarlapudi | H04W 72/1242 370/329 |

OTHER PUBLICATIONS

Wei, Huan-Yun et al., "Co-DRR: An Integrated Uplink and Downlink Scheduler for Bandwidth Management over Wireless LANs", IEICE Trans. Commun. vol. E90B. No. 8, Aug. 2007, 2022-2033.

* cited by examiner

DOWNLINK FLOW MANAGEMENT

TECHNICAL FIELD

The proposed technology generally relates to flow management in telecommunication networks, and in particular to methods and devices for downlink flow management in Long Term Evolution (LTE) telecommunication networks.

BACKGROUND

In recent telecommunication networks, communication of very different character takes place simultaneously. Small packet flows, such as e.g. Voice over Internet Protocol (VoIP) or small objects transferred over the Transmission Control Protocol (TCP), such as chat or gaming, are mixed with larger data quantities e.g. large File Transfer Protocol (FTP) downloads. Such an inhomogeneous mix of traffic occurs in particular in the downlink (DL) signaling, i.e. from an eNodeB to a User Equipment (UE). Typically, an eNode B has access to different bearers and the traffic is divided between these bearers.

The current state of the art algorithms in Long-Term Evolution (LTE) systems put the flows belonging to a specific radio bearer into a queue. The queue is controlled by different kinds of Active Queue Management (AQM) algorithms. This approach operates well if the flows have roughly the same properties, for instance, two large file downloads can cooperate well. However, at occasions where small and fast flows compete with large file downloads and possibly also downloads of larger domain sharded websites, the effect will often be that the small and fast flows suffer from high latency and or packet loss. The small and fast flows, which often are delay sensitive, will then suffer from poor Quality-of-Experience (QoE).

This problem can be mitigated somewhat by making the queue short, which translates to e.g. low delay thresholds in the AQMs. The drawback of this approach is, however, that it can degrade throughput and it typically also increases the packet loss rates, which can be detrimental for small TCP transfers as it takes a round trip to retransmit the missing TCP segments.

Another way of mitigating this problem would be to put the delay sensitive short and fast flows in separate bearers, and possibly let them have a higher scheduling priority. Ideas like this, however, seem to have difficulties in their realization. Possible reasons are that they require a classification engine and also additional signaling to set up bearers for these short and fast flows, which often may have a very short lifetime. The overall management processing thereby may be extremely high.

SUMMARY

It is an object to provide improved flow management of mixed-character downlink traffic. This and other objects are met by embodiments of the proposed technology, as expressed in the enclosed independent claims. Preferred embodiments are defined in dependent claims.

According to a first aspect, there is provided a flow management method in a communication node. The flow management method comprises receiving of incoming downlink packets. The received downlink packets are classified in sub-flows. The classification is based on information that is available in a header of respective such received downlink packet. The downlink packets of each sub-flow are queued in a respective sub-flow queue. Downlink packets are extracted from the sub-flow queues into a common outgoing flow. A sub-flow queue from which no downlink packets yet have been extracted is prioritized. The extraction of downlink packets is made in a basic Round Robin fashion. This comprises assigning of an indicator of last service occasion to each sub-flow queue when an extraction of downlink packets from the respective sub-flow queue has been completed. When no prioritized sub-flow queues are present, the sub-flow queue with the earliest last service is selected for a next extraction. When a prioritized sub-flow queue is present, the prioritized sub-flow queue is selected for a next extraction. The extraction of downlink packets from the respective sub-flow queue is considered to have been completed when a predetermined amount of data has been extracted from said respective sub-flow queue. The downlink packets of said common outgoing flow are finally sent.

According to a second aspect, there is provided a network node in a communication network. The network node comprises an input, a processor, a memory and an output. The memory comprises instructions executable by the processor. Thereby, the network node is operative to receive incoming downlink packets on the input. The network node is further operative to classify the received downlink packets in sub-flows. This classification is based on information that is available in a header of respective such received downlink packet. The network node is further operative to queue the downlink packets of each sub-flow in a respective sub-flow queue. The network node is further operative to extract downlink packets from the sub-flow queues into a common outgoing flow. The network node is further operative to prioritize a sub-flow queue from which no downlink packets yet have been extracted. The network node is operative to select downlink packets in a basic Round Robin fashion. This comprises assigning of an indicator of last service occasion to each sub-flow queue when an extraction of downlink packets from the respective sub-flow queue has been completed. When no prioritized sub-flow queues are present, the sub-flow queue with the earliest last service is selected for a next extraction. When a prioritized sub-flow queue is present, the prioritized sub-flow queue is selected for a next extraction. The network node is operative to consider that an extraction of downlink packets from the respective sub-flow queue is completed when a predetermined amount of data has been extracted from the respective sub-flow queue. The network node is further operative to send the downlink packets of the common outgoing flow on the output.

An advantage of the proposed technology is that it enables low latency for small and fast flows when they are subject to competition from flows that are large or in other ways aggressive in their nature. Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference numbers are used for similar or corresponding elements.

Figure 1:
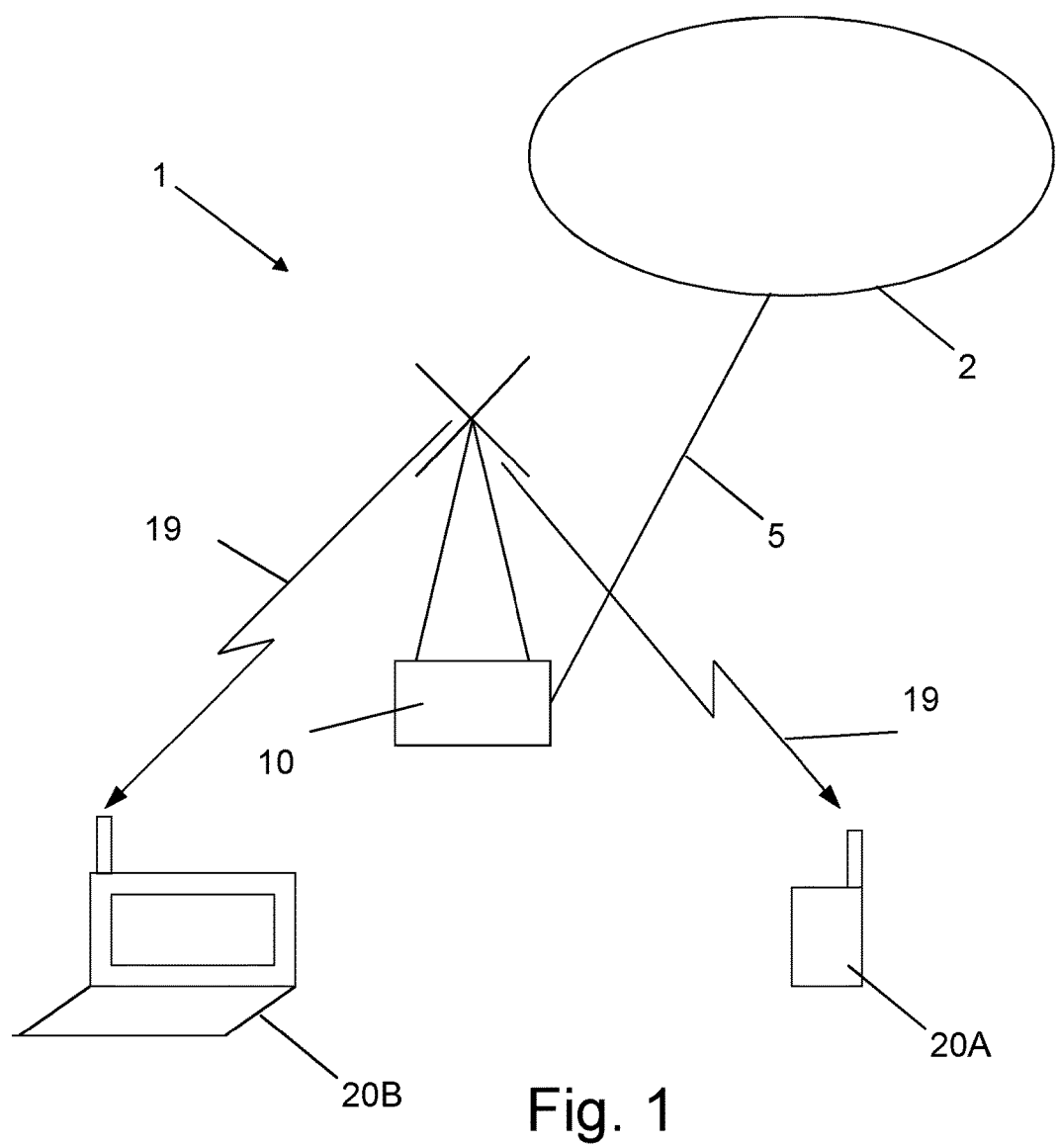
FIG. 1 schematically illustrates a telecommunication system.

This disclosure describes how flow queuing can be implemented LTE for the queue management of downlink traffic. The invention solves the problem where The invention describes how a flow queue algorithm is implemented in LTE and also how a high peak throughput is ensured. For a better understanding of the proposed technology, it may be useful to begin with a brief overview of a telecommunication system and in particular downlink packet handling in an eNodeB FIG. 1 illustrates schematically a telecommunication system. A base station, e.g. an eNodeB 10 is connected by a connection 5 to a packet providing arrangement 2. This packet providing arrangement 2 may typically be a core network of the telecommunication system 1, network nodes connecting to the Internet or the like. As the name suggests, the packet providing arrangement 2 provides packets to be forwarded in a DL direction in the telecommunication system 1. The eNodeB 10 is operative to communicate with different UEs 20A, 20B. Packets are sent from the eNodeB 10 on DL links 19 to the UEs. The network node therefore includes radio circuitry for communication with one or more other nodes, including transmitting and/or receiving information.

The DL packets can be of very different character. In the present disclosure, the term "mice flows" is used for denoting small packet flows, e.g. VoIP, or small objects transferred over TCP, e.g. chat or gaming. Analogously, the term "elephant flows" is used for denoting large packet flows, e.g. large FTP downloads of long duration such as large file downloads and possibly also downloads of larger domain sharded websites. Domain sharding is a commonly used technology to boost webpage downloads. The web browser may open up simultaneous TCP connections towards several different domains and is thus able to loop around good netiquette. This technique is an aggressive way to grab bandwidth and can actually degrade performance also for the web page download.

As used herein, the term "wireless device" may refer to a User Equipment, UE, a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a portable electronic radio communication device, a sensor device equipped with radio communication capabilities or the like. In particular, the term "UE" should be interpreted as a non-limiting term comprising any device equipped with radio circuitry for wireless communication according to any relevant communication standard.

As used herein, the term "radio network node" or simply "network node" may refer to base stations, network control nodes, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, and even radio control nodes controlling one or more Remote Radio Units, RRUs, or the like.

Figure 2:
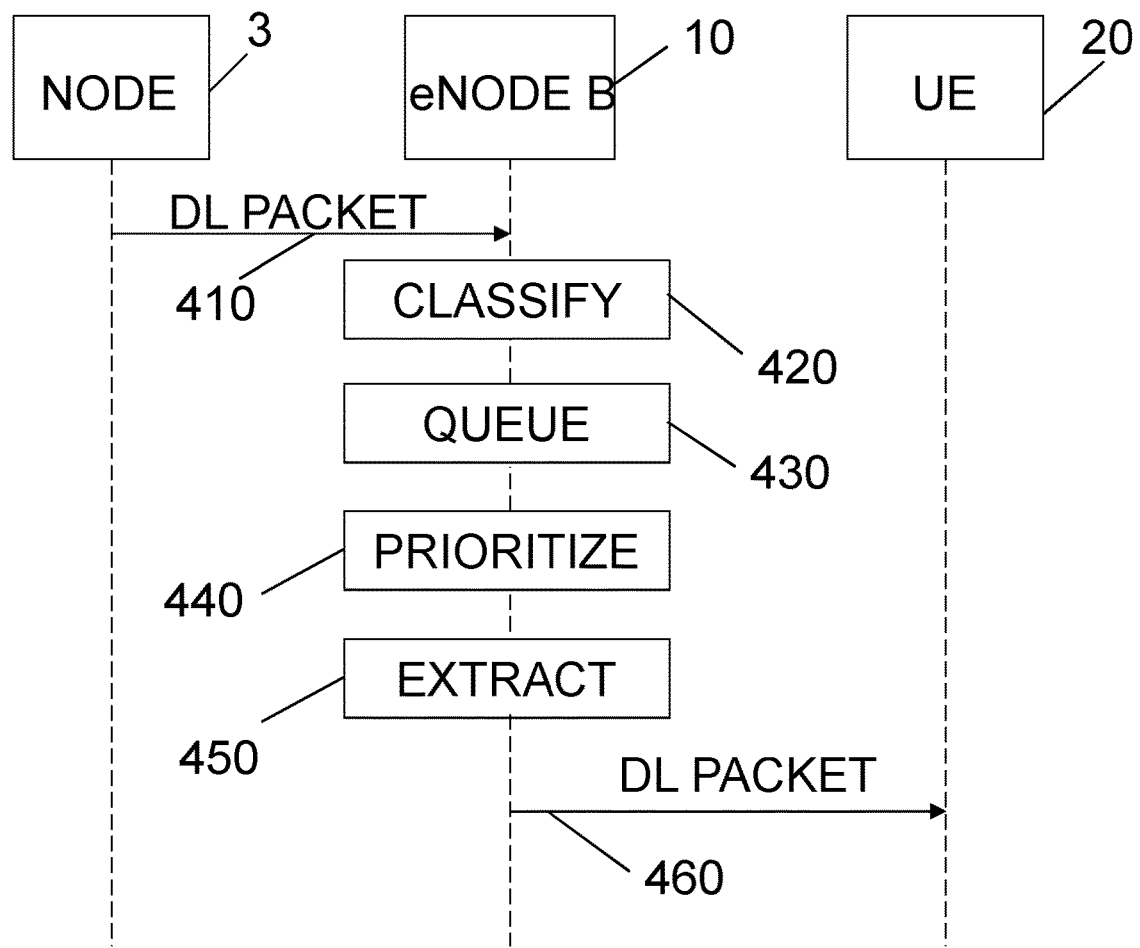
FIG. 2 presents a simplified signalling scheme of signalling between network nodes.

FIG. 2 presents a simplified signalling scheme of signalling between a first node 3, comprised in the packet providing arrangement 2 (FIG. 1), an eNodeB 10 and a UE 20. The first node 3 sends 410 DL packets to the eNodeB 10 to be further transmitted on a bearer. The DL packets are received in the eNodeB 10 and are classified 420 in sub-flows. The classification is based on information that is available in a header of respective such received DL packet. The downlink packets of each sub-flow are queued 430 in a respective sub-flow queue. The creation of several sub-flow queues creates possibilities for packets of different character or nature to be separated. Packets of elephant flows which are potential blocking items in the case of a single queue may now be separated from mice flows. This opens up for different routines of prioritizing certain types of packets.

In one embodiment, flows are classified by a 5-tuple or 3-tuple in an information element of the packet header. The 5-tuple comprises the source ip address and port, the destination ip address and port, and the used protocol. The 3-tuple comprises the source ip address and port, and the used protocol. Based on the classification, packets with different 5-tuples or 3-tuples are put in different queues.

In a particular embodiment, each sub-flow queue maintains its own AQM algorithm. The purpose of the AQM is to keep the size of the sub-flow queue within reasonable limits. The AQM thresholds do, however, not need to be tuned for low delay. This helps to ensure high link utilization. In other words, a flow management method preferably comprises the step of performing AQM in each sub-flow queue separately.

It is actually not strictly necessary to use AQM at all. In an alternative embodiment, the sub-flow queues lack separate AQM algorithms. The sub-flows queues are isolated, which means that large elephant flows do not degrade performance for small mice flows.

It is, however, preferred to use some kind of AQM as individual queues may otherwise consume large amounts of memory, also typical transports like TCP perform optimally when AQMs are deployed in the networks.

In one particular embodiment, selected content from the packet header is entered into a hash function, giving an output number. This number indicates the sub-flow queue in which the packet is to be placed. The hash function is used to maintain an upper bound to the number of sub-flows with a queue each. If the number of sub-flows is small, the risk of hash-collision, i.e. that two or more different flows are classified to the same sub-flow, increases. The impact of hash collision can be limited with a smart design of the hash algorithm. Thereby, for instance classifying of User Datagram Protocol (UDP) and TCP flows into the same sub-flow queue can be avoided. In the context of LTE eNodeB implementation it can be beneficial to allow for a large number of sub-flows. In a statistical sense, users maintain an average number of sub-flows. The queues for the sub-flows can be picked from a common pool of queues. It is only in cases where the pool becomes nearly depleted that the max number of sub-flows needs to be limited.

Returning to FIG. 2, a prioritizing 440 is performed. A sub-flow queue from which no DL packets yet have been extracted is prioritized. DL packets are extracted 450 from the sub-flow queues into a common outgoing flow. The extraction of DL packets is made in a basic Round Robin fashion. This means that each sub-flow queue is served in turn, so that the sub-flow queue that has waited the longest time since the last service is the next one in order to be served. In other words, this Round Robin thereby comprises assigning of an indicator of last service occasion to each sub-flow queue when an extraction of downlink packets from the respective sub-flow queue has been completed. The extraction of downlink packets from the respective sub-flow queue is considered to have been completed when a predetermined amount of data has been extracted from the respective sub-flow queue. When no prioritized sub-flow queues are present, the sub-flow queue with the earliest last service is selected for a next extraction.

However, the prioritizing may interfere with this basic Round Robin function. To that end, when a prioritized sub-flow queue is present, the prioritized sub-flow queue is selected for a next extraction.

The prioritizing is performed for achieving a concept that fit better into the protocol stack of an LTE base station, i.e. an eNodeB), and in general to make it perform better with diverse traffic. The fact that new sub-flows are given a higher priority improves the performance for flows that are sparse in character. A new sub-flow thereby breaks the Round Robin order and becomes served immediately. Furthermore, since the extraction of DL packets is considered to have been completed only when a predetermined amount of data has been extracted from the respective sub-flow queue, it becomes possible to adapt how many bytes that are allowed to break the Round Robin order. In other words, new sub-flows are given a quantum of bytes, meaning that the given sub-flow is given priority as long as it has not consumed this quantum of bytes. This means that even if a new sub-flow has a number of packets, the priority may be valid for all the packets if they are small enough.

In a particular embodiment, the indicator of last service occasion can be implemented by a lastServedTime parameter. A lastServedTime for a particular sub-flow queue can be set to the current wall clock time only when a sub-flow has sent a predetermined amount of data. If the sub-flow queue becomes empty, before the predetermined amount of extracted data is reached, the entire sub-flow queue will be removed. This means that each sub-flow queue maintains a lastServedTime value. As mentioned above, this value is normally set to a reference time when a packet or packets exceeding the predetermined amount of data is/are extracted from the queue. This supports the default Round-Robin mechanism described above. The lastServedTime value is only updated when packets corresponding to a minimal number of bytes, e.g. MTU/2, have been extracted from the sub-flow. Maximum Transmission Unit (MTU) is the largest packet size handled by the flow queue algorithm. This improves performance for mice flows in conditions where the network is highly congested.

In a preferred embodiment, the predetermined amount of data is set individually for the respective sub-flow queues. In such a way, it might even be possible to obtain a further fine-tuning of the favoring of different sub-flow queues. If one type of sub-flow is requested to be favored despite that the sub-flow contains more packets than a "common" predetermined amount of data, the predetermined amount of data for this particular sub-flow queue necessary to fulfill the completing of an extraction operation can be increased. In the same way, sub-flow queues for mice flows, that are not sensitive at all for e.g. delays, can be given a much lower predetermined amount of data before the extraction is considered as being completed.

In an alternative embodiment, the indicator of last service occasion can be implemented by a counter for the number of served queues. When extraction of DL packets from the respective sub-flow queue has been completed, the indicator of last service occasion is set equal to the reading of the counter. The counter is then incremented one step. The indicator of last service occasion then has the information about in which order the different sub-flow queues are served, however, without time stamps.

The person skilled in the art realizes that the indicator of last service occasion can be implemented in many other ways as well, as long as the indicator of last service occasion keeps track of the order in which the flow queues are served.

In a preferred embodiment, new sub-flow queues are provided when new sub-flows occur and empty sub-flow queues are removed. This can in a particular embodiment be performed in cooperation with a common pool of queues. The provision of new sub-flow queues then comprises picking of a queue from the common pool of queues. Likewise, the removal of empty sub-flow queues then comprises returning of an empty sub-flow queue to the common pool of queues.

As some sub-flows can become empty and therefore are removed between the packets for a sparse mouse flow, this means that these small flows get a new quantum of prioritized bytes for each new tiny burst of data. This helps to improve performance greatly for these small flows. For the end users this can translate to lower latency for VoIP and better interactivity for chatty services.

Packets are extracted from the sub-flow queues in a round-robin fashion and sub-flows that become empty are removed, in the case where queues are picked from a pool of queues, the empty queue is returned to the pool. The DL packets of the common outgoing flow are finally sent 460 from the eNodeB 10 to the UE 20.

Figure 3:
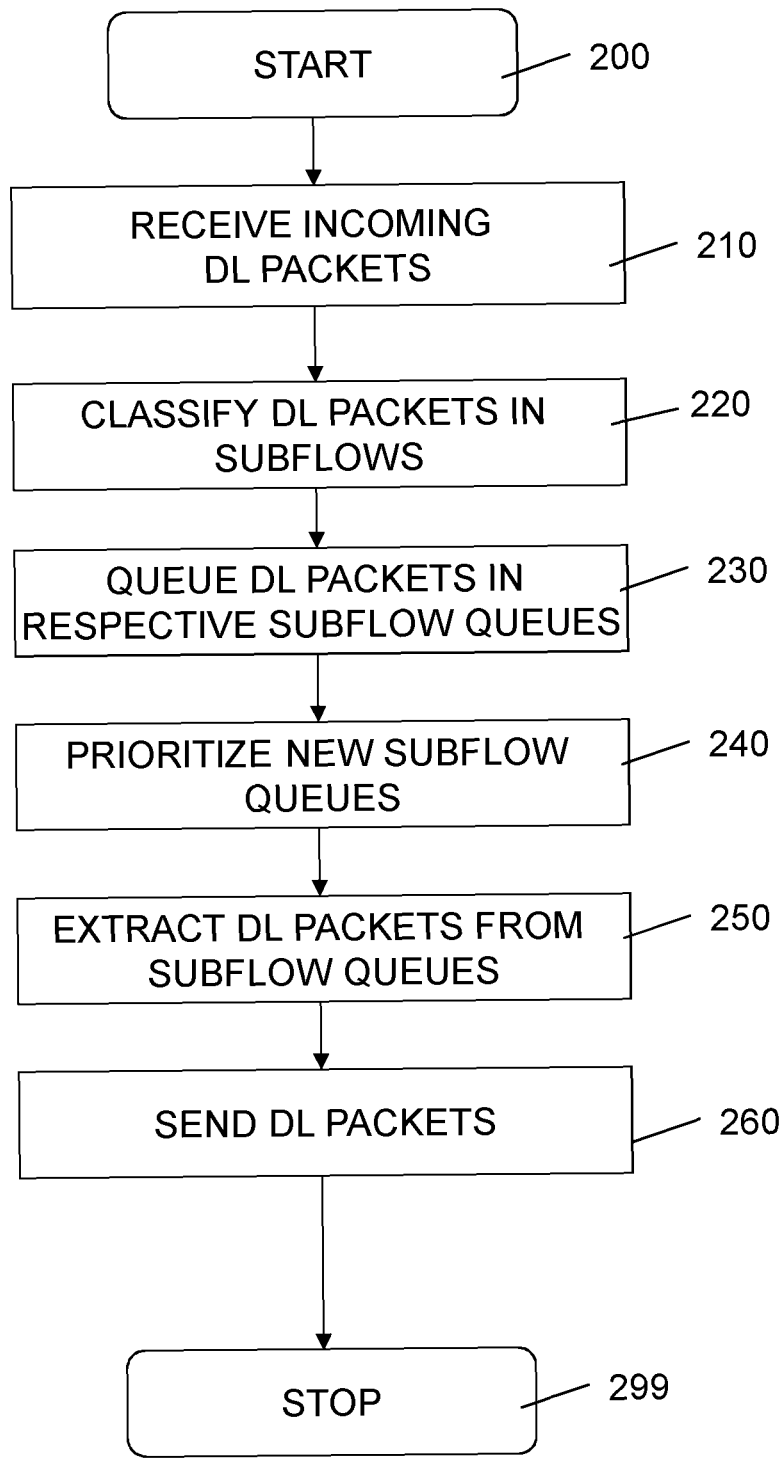
FIG. 3 illustrates a flow diagram of steps of an embodiment of a flow management method in a communication node.

FIG. 3 illustrates a flow diagram of steps of an embodiment of a flow management method in a communication node. The process starts in step 200. In step 210, incoming DL packets are received. In step 220, the received DL packets are classified in sub-flows. This classification is based on information that is available in a header of respective such received downlink packet. The DL packets of each sub-flow are in step 230 queued in a respective sub-flow queue. In step 240, a sub-flow queue from which no downlink packets yet have been extracted is prioritized. DL packets are in step 250 extracted from the sub-flow queues into a common outgoing flow. The step of extracting DL packets is made in a basic Round Robin fashion. This is performed by assigning an indicator of last service occasion to each sub-flow queue when an extraction of downlink packets from the respective sub-flow queue has been completed. When, no prioritized sub-flow queues are present, the sub-flow queue with the earliest last service is selected for a next extraction. When a prioritized sub-flow queue is present, the prioritized sub-flow queue is selected for a next extraction. The step of extraction of DL packets from the respective sub-flow queue is considered to have been completed when a predetermined amount of data has been extracted from the respective sub-flow queue. In step 260, the DL packets of the common outgoing flow are sent. The process ends in step 299. This embodiment is particularly well suited for providing better performance in LTE eNodeB implementation.

In one embodiment, the conditions for mice flows can be further improved by additionally prioritize sub-flow queues comprising packets of small sizes or packets that are sparse in their nature, even if they do not belong to new sub-flow queues. By sparse traffic should be understood traffic involving bursts of small amounts of data. Typical examples of sparse traffic are VoIP, chat and certain types of gaming traffic involving player locations etc. The data volume of such sparse traffic is so low that idle periods occur between the bursts. This embodiment modifies the round-robin sub-flow handling such that mice flows are given a higher priority.

Figure 4:
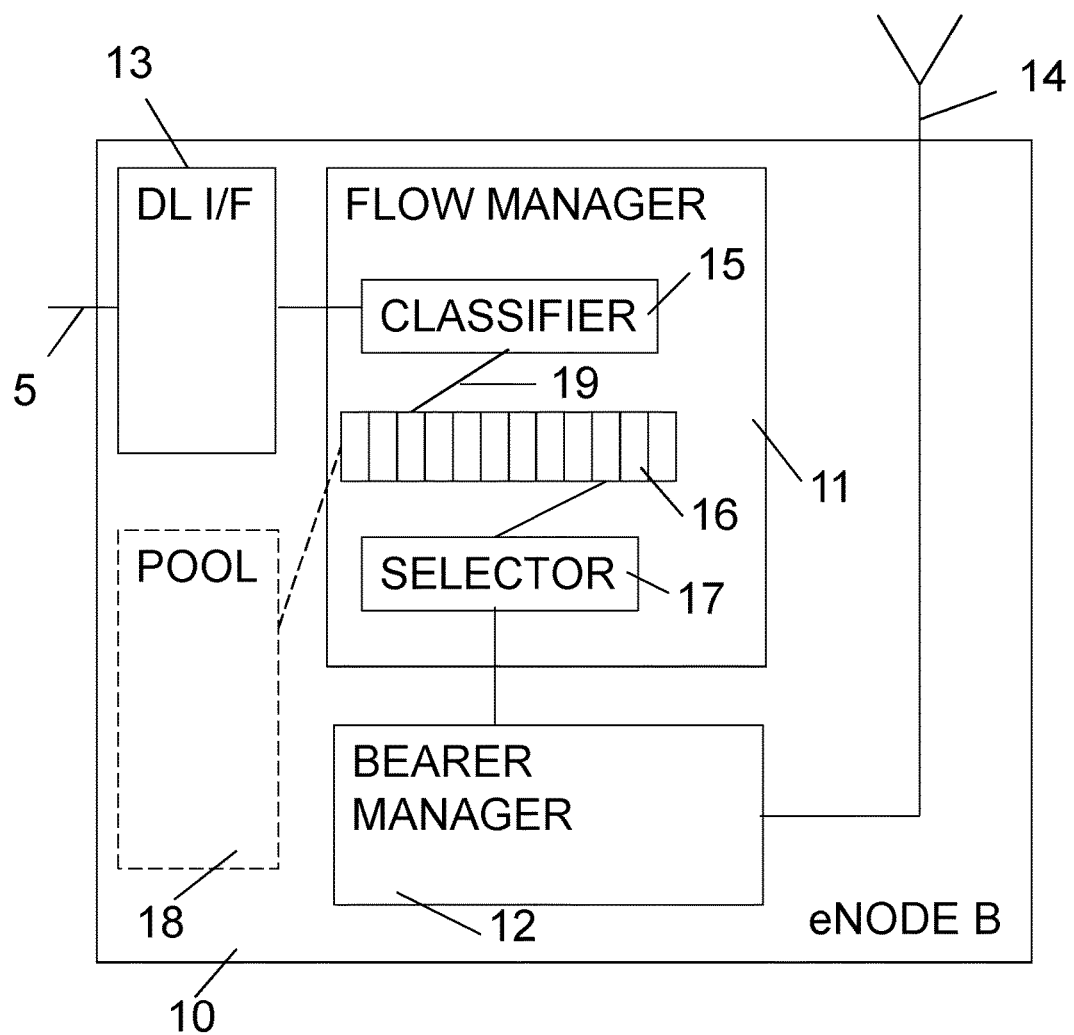
FIG. 4 illustrates a schematic block diagram of an embodiment of a network node in a communication network.

FIG. 4 illustrates a schematic block diagram of an embodiment of a network node in a communication network. In this embodiment, the network node is an eNodeB 10. DL packets 5 are received via an input by a receiver, in this particular embodiment a DL interface 13, configured to receive incoming DL packets. The received DL packets are handed over to a flow manager 11. In the flow manager 11, a classifier 15 is configured to classify the received DL packets in sub-flows. This classification is based on information being available in a header of respective received DL packet. Based on this classification, the DL packets of each sub-flow are queued in a respective sub-flow queue 16 by a queue manager 19. A selector 17 is configured to make certain sub-flow queues 16 prioritized. To this end the selector 17 is configured to prioritize a sub-flow queue from which no downlink packets yet have been extracted. The selector 17 is further configured to extract DL packets from said sub-flow queues 16 into a common outgoing flow. DL packets are then extracted in a basic Round Robin fashion, which involves assigning an indicator of last service occasion to each sub-flow queue when an extraction of downlink packets from the respective sub-flow queue has been completed. It is considered that an extraction of downlink packets from the respective sub-flow queue is completed when a predetermined amount of data has been extracted from the respective sub-flow queue. When no prioritized sub-flow queues are present, the sub-flow queue with the earliest last service is selected for a next extraction. When a prioritized sub-flow queue is present, the prioritized sub-flow queue is selected. The common outgoing flow of packets is provided to a transmitter entity, in this particular embodiment a bearer manager 12, which is configured to send the DL packets of the common outgoing flow over an antenna 14 via an output.

In a preferred embodiment, the network is additionally operative to provide new sub-flow queues when new sub-flows occur and to remove empty sub-flow queues. This is in a further preferred embodiment performed by means of a pool 18 of queues. The network node is then additionally operative to perform the providing of new sub-flow queues by picking a queue from the common pool 18 of queues and to perform said removing of empty sub-flow queues by returning an empty sub-flow queue to the common pool 18 of queues.

It will be appreciated that the methods and devices described above can be combined and re-arranged in a variety of ways. For example, embodiments may be implemented in hardware, or in software for execution by suitable processing circuitry, or a combination thereof.

The steps, functions, procedures, modules and/or blocks described above may be implemented in hardware using any conventional technology, such as discrete circuit or integrated circuit technology, including both general-purpose electronic circuitry and application-specific circuitry. Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described above may be implemented in software such as a computer program for execution by suitable processing circuitry including one or more processing units. The flow diagram or diagrams presented above may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

Figure 5:
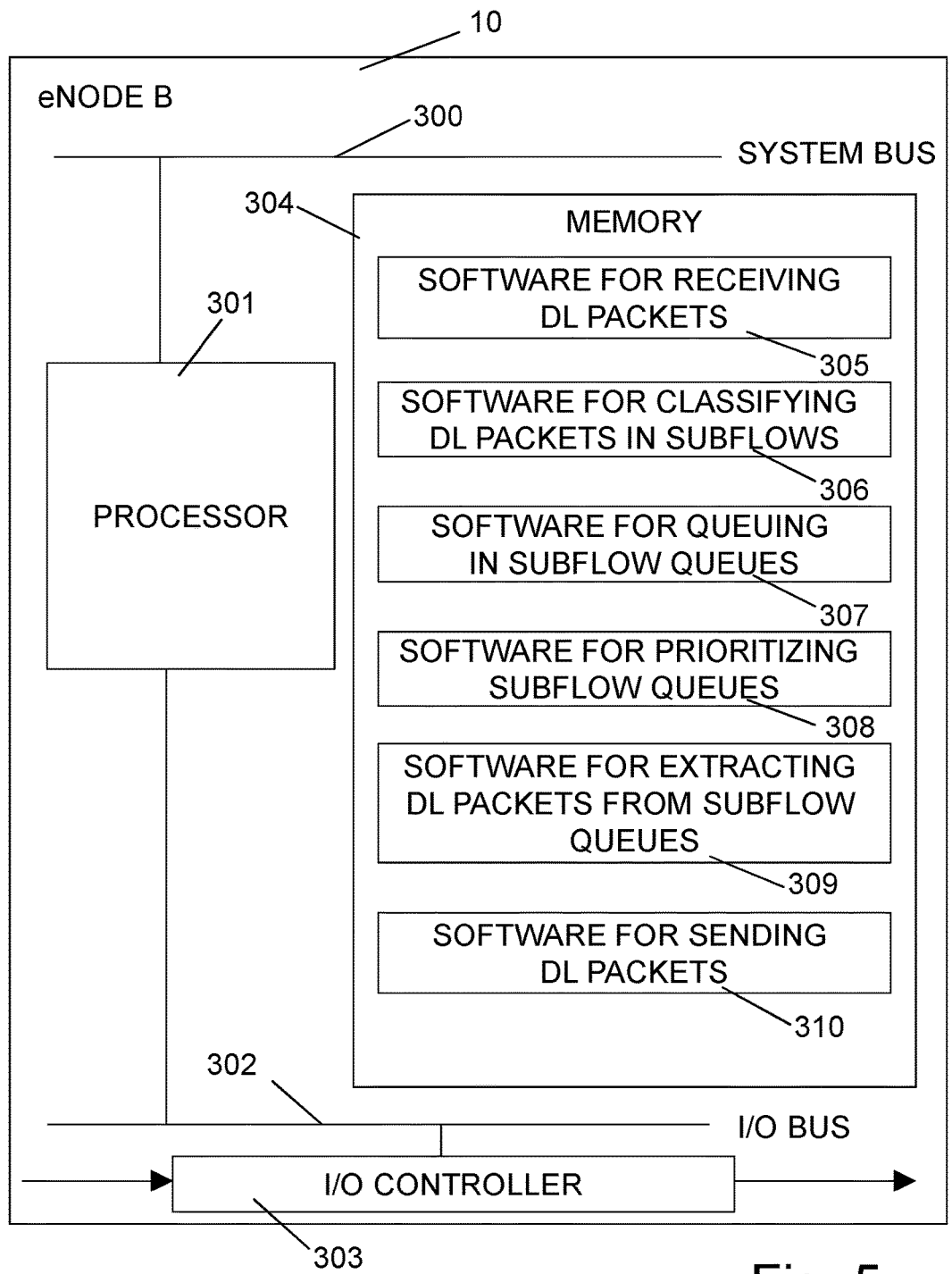
FIG. 5 illustrates an embodiment of a network node implemented by a processor by means of software.

In one particular embodiment, the flow management functionalities in a network node are implemented by a processor by means of software. Such an implementation example is illustrated in FIG. 5 as a block diagram. This embodiment is based on a processor 301, a memory 304, a system bus 300, an input/output (I/O) controller 303 and an I/O bus 302. In this embodiment DL packets are received by the I/O controller 303 and are stored in the memory 304. The I/O controller 303 also controls the issue of DL packets of the common outgoing flow. The processor 301, which may be implemented as one or a set of cooperating processors, executes software components stored in the memory 304 for performing the flow management. The processor 301 communicates with the memory 304 over the system bus 300. In particular, software component 305 may implement the functionality of receiving DL packets. Software component 306 may implement the functionality of classifying DL packets in sub-flows, e.g. as of the classifier 15 (FIG. 4). Software component 307 may implement the functionality of queuing sub-flows in sub-flow queues in said memory 304. Software component 308 may implement the functionality of prioritizing sub-flow queues of the selector 17 (FIG. 4). Software component 309 may implement the functionality of extracting DL packets from sub-flow queues, e.g. as of the selector 17 (FIG. 4). Software component 310 may implement the functionality of sending DL packets.

In other words, a network node in a communication network comprises an input, a processor 301, a memory 304 and an output. The memory 304 comprises instructions 305-310 executable by the processor 301. Thereby, the network node is operative to receive incoming downlink packets on the input. The network node is further operative to classify the received downlink packets in sub-flows. This classification is based on information that is available in a header of respective such received downlink packet. The network node is further operative to queue the downlink packets of each sub-flow in a respective sub-flow queue. The network node is further operative to extract downlink packets from the sub-flow queues into a common outgoing flow. The network node is further operative to prioritize a sub-flow queue from which no downlink packets yet have been extracted. The network node is operative to select downlink packets in a basic Round Robin fashion. This comprises assigning of an indicator of last service occasion to each sub-flow queue when an extraction of downlink packets from the respective sub-flow queue has been completed. When no prioritized sub-flow queues are present, the sub-flow queue with the earliest last service is selected for a next extraction. When a prioritized sub-flow queue is present, the prioritized sub-flow queue is selected for a next extraction. The network node is operative to consider that an extraction of downlink packets from the respective sub-flow queue is completed when a predetermined amount of data has been extracted from the respective sub-flow queue. The network node is further operative to send the downlink packets of the common outgoing flow on the output.

Figure 6:
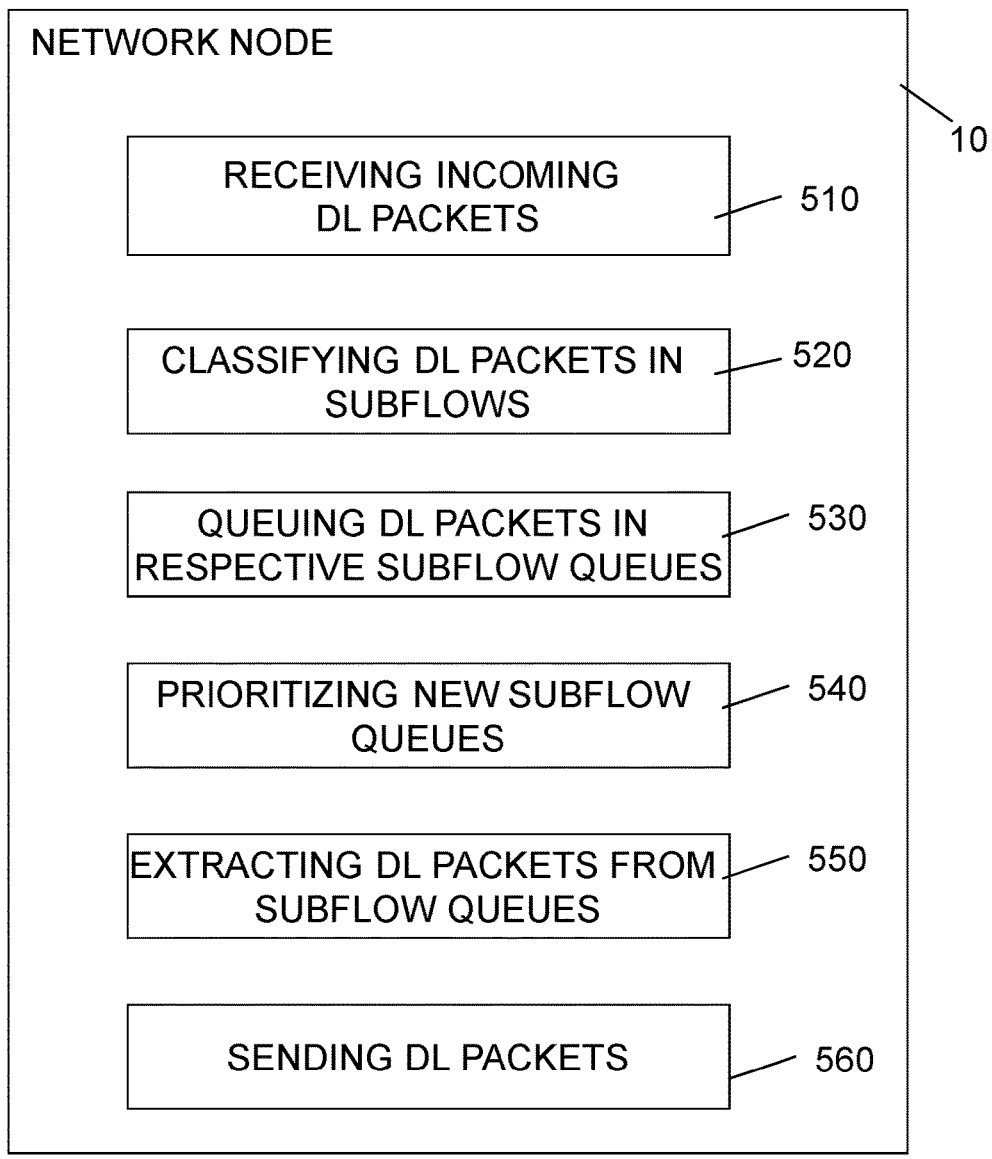
FIG. 6 is a schematic block diagram illustrating an example of a network node.

As indicated above, the network node may alternatively be defined as a group of function modules, where the function modules are implemented as a computer program running on a processor. FIG. 6 is a schematic block diagram illustrating an example of a network node 10 comprising a group of function modules. Receiving module 510 constitutes means for receiving incoming DL packets. Classifying module 520 constitutes means for classifying the received DL packets in sub-flows, based on information being available in a header of respective said received DL packet. Queuing module 530 constitutes means for queuing the DL packets of each sub-flow in a respective sub-flow queue. Prioritizing module 540 constitutes means for prioritizing a sub-flow queue from which no downlink packets yet have been extracted. Extracting module 550 constitutes means for extracting downlink packets from the sub-flow queues into a common outgoing flow. The extraction of downlink packets is made in a basic Round Robin fashion, assigning an indicator of last service occasion to each sub-flow queue when an extraction of downlink packets from the respective sub-flow queue has been completed, and selecting, when no prioritized sub-flow queues are present, the sub-flow queue with the earliest last service for a next extraction, and when a prioritized sub-flow queue is present, the prioritized sub-flow queue. The extraction of downlink packets from the respective sub-flow queue is considered to have been completed when a predetermined amount of data has been extracted from the respective sub-flow queue. Sending module 560 constitutes means for sending the downlink packets of the common outgoing flow.

The software or computer program may be realized as a computer program product, which is normally carried or stored on a computer-readable medium. The computer-readable medium may include one or more removable or non-removable memory devices including, but not limited to a Read-Only Memory, ROM, a Random Access Memory, RAM, a Compact Disc, CD, a Digital Versatile Disc, DVD, a Universal Serial Bus, USB, memory, a Hard Disk Drive, HDD storage device, a flash memory, or any other conventional memory device. The computer program may thus be loaded into the operating memory of a computer or equivalent processing device for execution by the processing circuitry thereof.

In other words, in a particular embodiment, a computer program comprises program code which when executed by a processing circuitry causes the processing circuitry to receive incoming downlink packets, to classify the received downlink packets in sub-flows, based on information that is available in a header of respective ones of the received downlink packets, to queue the downlink packets of each sub-flow in a respective sub-flow queue, to extract downlink packets from said sub-flow queues into a common outgoing flow, to prioritize a sub-flow queue from which no downlink packets yet have been extracted and to send the downlink packets of the common outgoing flow. The extracting of downlink packets is made in a basic Round Robin fashion, assigning an indicator of last service occasion to each sub-flow queue when an extraction of downlink packets from the respective sub-flow queue has been completed, and selecting, when no prioritized sub-flow queues are present, the sub-flow queue with the earliest last service for a next extraction, and when a prioritized sub-flow queue is present, the prioritized sub-flow queue. The extracting of downlink packets from the respective sub-flow queue is considered to have been completed when a predetermined amount of data has been extracted from the respective sub-flow queue.

The computer or processing circuitry does not have to be dedicated to only execute the above-described steps, functions, procedure and/or blocks, but may also execute other tasks.

In a preferred embodiment, the flow queue algorithm in the LTE eNodeB is implemented mainly on the Packet-Data Convergence Protocol (PDCP) layer. The reason is the ciphering that is applied on the PDCP layer. An implementation of the flow queue algorithm on the Radio Link Control (RLC) layer may require that the PDCP sequence numbers are renumbered as PDCP Protocol Data Units (PDUs) may be extracted out of order by the flow queue algorithm, and this gives problems with the ciphering and potentially a complexity increase.

When implementing the flow queue algorithm on the PDCP layer additional challenges arise. For reasons of efficiency it is preferable to always have a few PDCP-PDUs preprocessed and available in the RLC buffer, as RLC-Service Data Units (SDUs), ready to be forwarded to the Medium Access Control (MAC) layer. Failure to do so will lead to poor link utilization. Too many RLC-SDUs in the RLC buffer may give problems with high latency if the temporal throughput is not high enough. Too few RLC-SDUs can give poor link utilization in cases when throughput is high, meaning that the full potential of LTE cannot be exploited.

One embodiment solves this problem by computing the temporal throughput and by estimating the number of PDCP-PDUs that should be preprocessed and forwarded down to the RLC layer, and put in the RLC buffer. A preferred implementation computes a target RLC SDU buffer level in number or bytes. New PDCP-PDUs are generated when it is detected that the buffer level is below the target. The buffer target level is preferably computed as:

$$target = throughputDL * interval/8$$

where "throughputDL" is the estimated temporal throughput in the downlink and "interval" indicates how many seconds of data should be available in the RLC SDU buffer. In theory it is sufficient that enough data for a 1 ms TN is preprocessed and ready in the RLC SDU buffer. The interval can then be set equal to the TTI (1 ms). However, as a safety measure it is preferred to be set a bit higher, e.g. 10 ms, to compensate for the fact that the estimation of the downlink throughput in itself has a certain integration time.

In other words, the flow management method is preferably implemented in a PDCP layer. The preferred method comprises computing of a temporal downlink throughput and estimating, based on the temporal downlink throughput, a number of PDCP-PDUs necessary for keeping a RLC SDU buffer at a buffer target value. The buffer target value is selected to assure a full utilization of available resource blocks. The method further comprises preprocessing of the estimated number of PDCP-PDUs and putting the preprocessed PDCP-PDUs in said RLC SDU buffer. This results in that the RLC SDU buffer is always sufficiently full, to be able to utilize the available resource blocks fully.

For stable operation the target value should be limited by a lower and upper bound. A lower bound of at least an MTU (typically 1500 byte) is typically preferred to ensure that TCP segments can be transmitted. An upper bound can be useful to ensure that latency does not reach very high values for instance in cases when the throughput estimation fails. Experiments have shown that a lower bound of 1.5*MTU and an upper bound of 15000 bytes work well.

Figure 7:
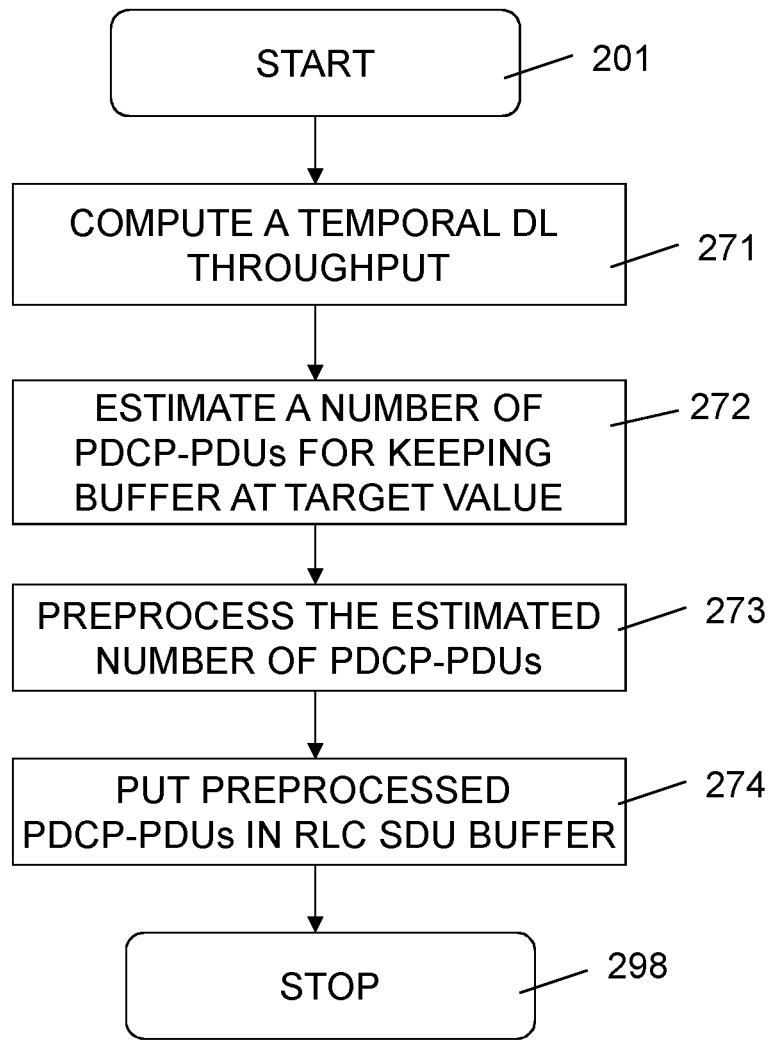
FIG. 7 illustrates a flow diagram of steps of an embodiment of implementing a flow management method in a PDCP layer in a communication node.

FIG. 7 illustrates a flow diagram of steps of an embodiment of a method for implementing operations of a network node in a PDCP layer. The process starts in step 201. In step 271, a temporal downlink throughput is computed. In step 272, a number of PDCP-PDUs necessary for keeping a RLC SDU buffer at a buffer target value is estimated based on the temporal downlink throughput. The used buffer target value assures a full utilization of available resource blocks. The estimated number of PDCP-PDUs are preprocessed in step 273. In step 274, the preprocessed PDCP-PDUs are put in the RLC SDU buffer. The process ends in step 298.

Figure 8:
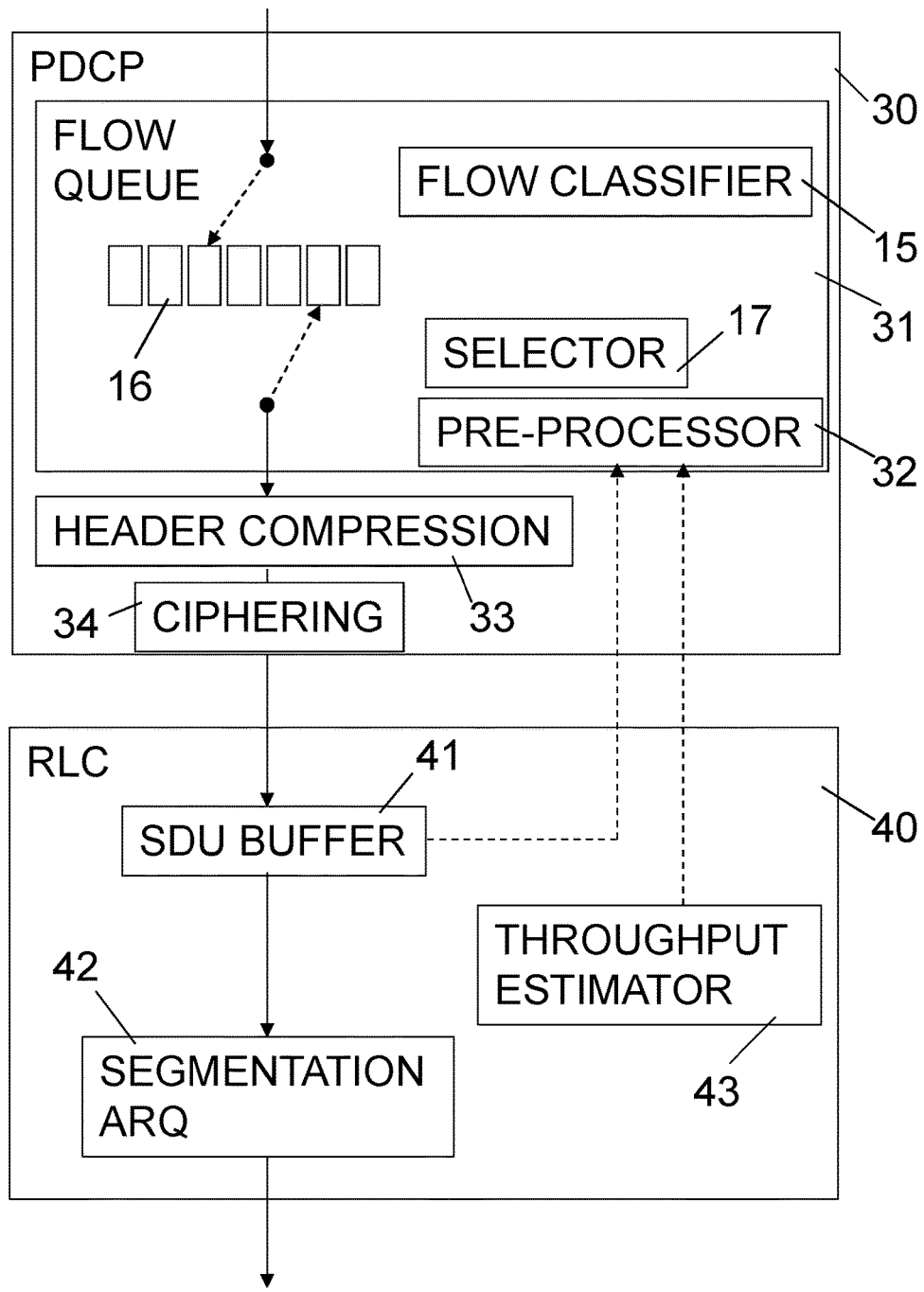
FIG. 8 illustrates an embodiment of an implementation of operations of a network node in a PDCP layer.

FIG. 8 illustrates an embodiment of an implementation of operations of a network node in a PDCP layer in a schematic manner. The network node is operative to compute a temporal downlink throughput, to estimate, based on the temporal downlink throughput, a number of PDCP-PDUs necessary for keeping a RLC SDU buffer at a buffer target value. The buffer target value is adapted for assuring a full utilization of available resource blocks. The network node is further operative to preprocess the estimated number of PDCP-PDUs and to put the preprocessed PDCP-PDUs in the RLC SDU buffer.

An incoming flow of DL packets arrives at the PDCP layer 30 of a network node. In a flow queue module 31, a flow classifier 15 classifies the packets and directs them into different sub-flow queues 16, as basically described above. A selector is the used to extract the packets in an order which mitigates elephant flows to jam the flow queue for mice flows. The outgoing common flow is typically provided to a header compression module 33 and then to a ciphering module 34. These modules are operating according to routines, known, as such, in prior art.

The common outgoing flow is provided to a SDU buffer 41 in the RLC layer 40 in order to be buffered ready for being outputted. When a new TTI starts, an appropriate number of SDUs are taken from the SDU buffer 41 and is provided to a segmentation Automatic Repeat-reQest (ARQ) module 42 for further output on the DL. A throughput estimator 43 of the RLC layer 40 is configured for computing a temporal downlink throughput. The temporal downlink throughput is reported to a pre-processor 32 in the flow queue module 31 in the PDCP layer. The SDU buffer 41 is also configured to report the present status of the SDU buffer 41 to the pre-processor 32. The pre-processor utilizes this information, in particular the temporal downlink throughput, to estimate a number of PDCP-PDUs necessary for keeping a RLC SDU buffer at a buffer target value. The pre-processor 32 is further configured for preprocessing the estimated number of PDCP-PDUs and to put the preprocessed PDCP-PDUs in the RLC SDU buffer 41.

Figure 9:
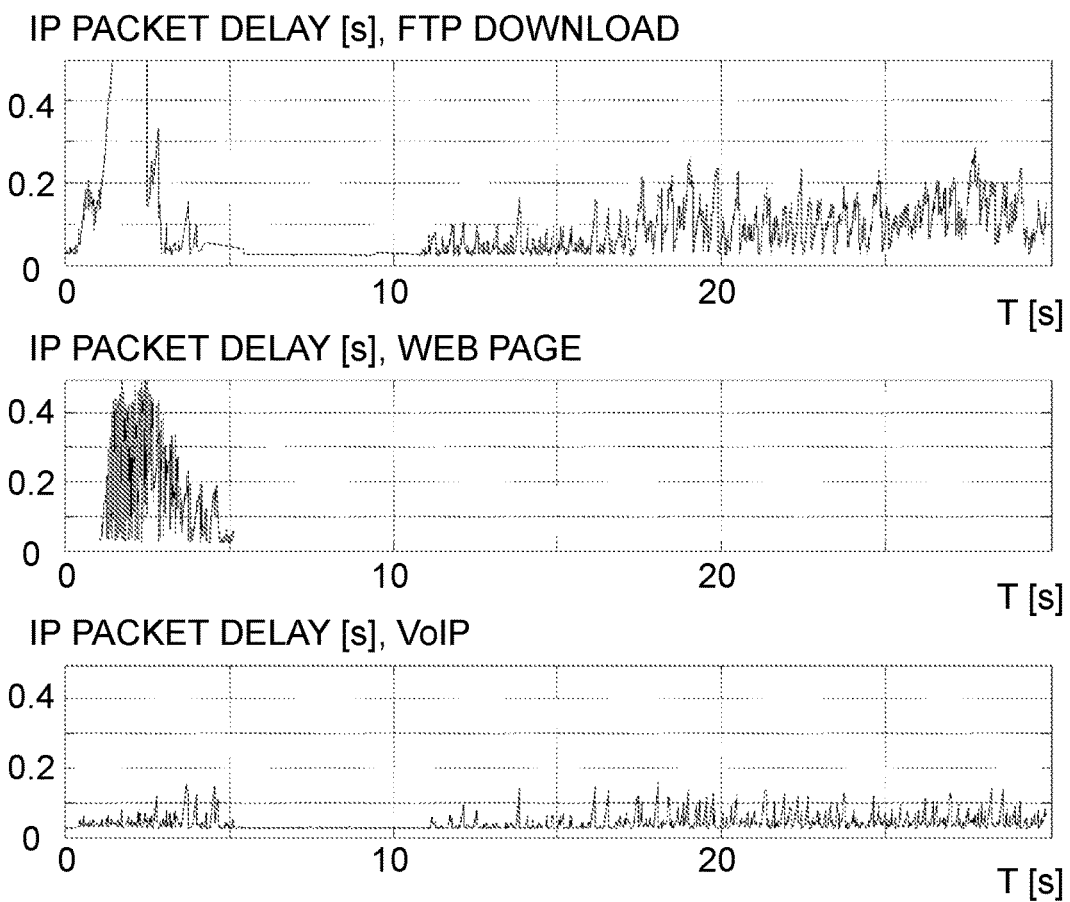
FIGS. 9 and 10 are diagrams of test simulations.

Test simulations have been performed. FIG. 9 illustrates an example where 3 different services transmit data in the downlink. The three services are FTP download, where a very large file is downloaded, WEB page download, where the webpage download aggressively opens up many simultaneous TCP connections and 20 kbps VoIP with a frame period of 20 ms, i.e. 50 frames/s. The graphs clearly show that even though the WEB page download is very aggressive to grab the bandwidth, the VoIP flow is almost undisturbed.

The present example shows that small (mice) flows, in this case VoIP can operate very well with low latencies even in the presence of very aggressive flows. The graph also shows that the FTP download is starved out by the web page download. The reason to this is that each TCP connection in the web page download gets its own queue. For a domain sharded web page with e.g. 40 simultaneous TCP connections this means that the web page download gets up to 40 times higher priority that the FTP download. In some cases this can be a desired property but in cases where streaming video competes with web downloads this can have a negative effect. One possible cure to this is to use only the 3-tuple, i.e. source IP/port, proto. This would give domain sharded web pages a lower priority.

Figure 10:
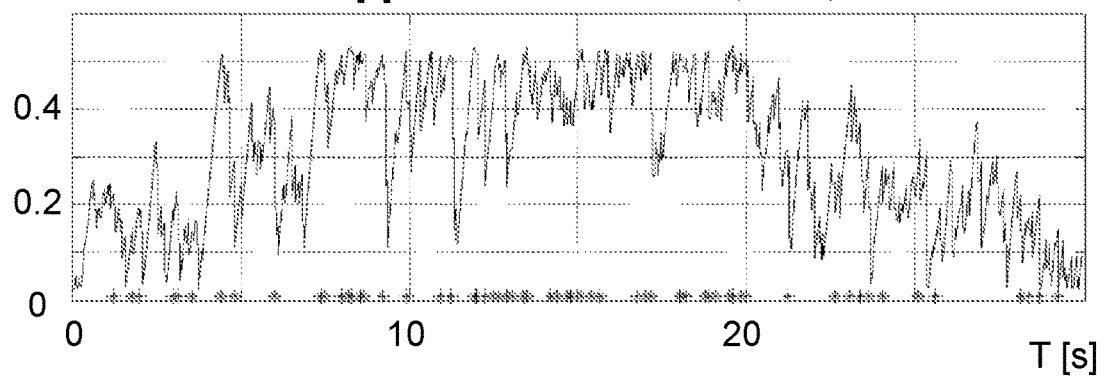
Figure 10:
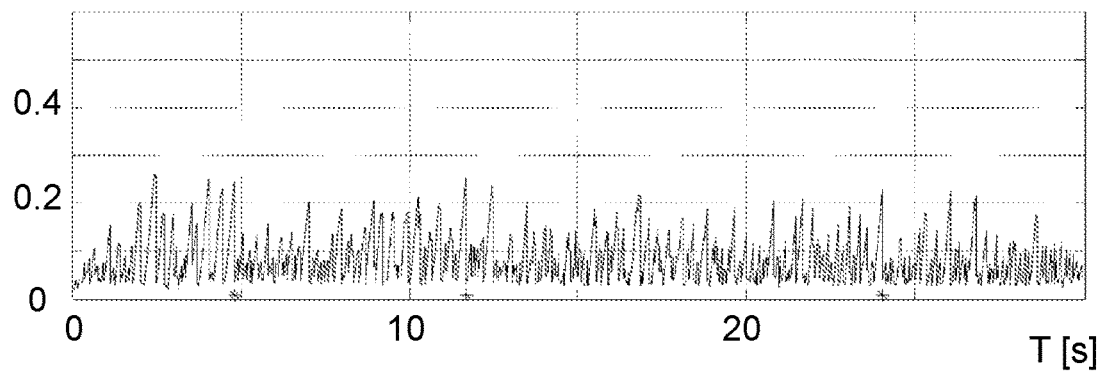

Another benefit with flow queuing besides the low latency is that mice flows experience very low packet loss rates. This is exemplified in FIG. 10. With AQMs that need to handle several different flows, it often becomes necessary to choose between either low latency or low packet loss rate for the mice flows that share the same bottleneck as large elephant flows. It is rarely the case that both goals are possible. Flow queuing according to ideas of the present disclosure on the other hand can reach both goals, as can be seen in the figure. IP packet delay and packet loss for VoIP are illustrated for the scenario described above. The packet losses are indicated by "*". The upper diagram illustrates a situation with prior art AQM. The lower diagram illustrates the situation when flow queuing according to the teachings in the present disclosure is applied.

The embodiments of the present disclosure can give properties that are at least close to what is achievable with multiple bearer solutions. The embodiments can therefore provide a smart mobile broadband performance booster in cases where Quality-of-Service (QoS) alternatives are not of interest. Such cases may be where best effort bearers are only either offered or the only alternative that the customer wants.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A flow management method in a communication node, comprising the steps of:
receiving incoming downlink packets;
classifying said received downlink packets in sub-flows, based on information being available in a header of respective said received downlink packet;
queuing said downlink packets of each sub-flow in a respective sub-flow queue;
extracting downlink packets from said sub-flow queues into a common outgoing flow;

prioritizing a sub-flow queue from which no downlink packets yet have been extracted;

said step of extracting downlink packets is made in a basic Round Robin fashion, assigning an indicator of last service occasion to each sub-flow queue when an extraction of downlink packets from the respective sub-flow queue has been completed, and selecting, when no prioritized sub-flow queues are present, the sub-flow queue with the earliest last service occasion for a next extraction, and when a prioritized sub-flow queue is present, said prioritized sub-flow queue; said step of extracting downlink packets from the respective sub-flow queue is considered to have been completed when a predetermined amount of data has been extracted from said respective sub-flow queue; and sending said downlink packets of said common outgoing flow, wherein said flow management method is implemented in a PDCP layer, further comprising the steps of:
computing a temporal downlink throughput;
estimating, based on said temporal downlink throughput, a number of PDCP-PDUs necessary for keeping a RLC SDU buffer at a buffer target value, said buffer target value assuring a full utilization of available resource blocks;
preprocessing said estimated number of PDCP-PDUs; and
putting said preprocessed PDCP-PDUs in said RLC SDU buffer.

2. The flow management method according to claim 1, wherein said step of classifying is performed on a content of one of a 5-tuple and a 3-tuple in an information element of said header.

3. The flow management method according to claim 1, wherein said predetermined amount of data is set individually for the respective sub-flow queues.

4. The flow management method according to claim 1, further comprising additionally prioritizing sub-flow queues comprising packets of small sizes or packets that are sparse in their nature.

5. The flow management method according to claim 1, further comprising the steps of providing new sub-flow queues when new sub-flows occur and removing empty sub-flow queues, said step of providing new sub-flow queues comprises picking a queue from a common pool of queues and said step of removing empty sub-flow queues comprises returning an empty sub-flow queue to said common pool of queues.

6. The flow management method according to claim 1, wherein said flow management method is implemented in an LTE network node.

7. The flow management method according to claim 6, wherein said LTE network node is an eNodeB.

8. A network node configured for operation in a communication network, said network node comprising an input, a processor, a memory and an output, said memory storing instructions executable by said processor whereby said network node is operative to:
receive incoming downlink packets on said input;
classify said received downlink packets in sub-flows, based on information being available in a header of respective said received downlink packet;
queue said downlink packets of each sub-flow in a respective sub-flow queue;
extract downlink packets from said sub-flow queues into a common outgoing flow;
prioritize a sub-flow queue from which no downlink packets yet have been extracted;
said network node is operative to extract downlink packets in a basic Round Robin fashion, assigning an indicator of last service occasion to each sub-flow queue when an extraction of downlink packets from the respective sub-flow queue has been completed, and selecting, when no prioritized sub-flow queues are present, the sub-flow queue with the earliest last service occasion for a next extraction, and when a prioritized sub-flow queue is present, said prioritized sub-flow queue;
said network node is operative to consider that an extraction of downlink packets from the respective sub-flow queue is completed when a predetermined amount of data has been extracted from said respective sub-flow queue; and
send said downlink packets of said common outgoing flow on said output,
wherein operations of said network node are implemented in a PDCP layer operative to:
compute a temporal downlink throughput;
estimate, based on said temporal downlink throughput, a number of PDCP-PDUs necessary for keeping a RLC SDU buffer at a buffer target value, said buffer target value assuring a full utilization of available resource blocks;
preprocess said estimated number of PDCP-PDUs; and
put said preprocessed PDCP-PDUs in said RLC SDU buffer.

9. The network node according to claim 8, wherein said network node is operative to perform a classification on a content of one of a 5-tuple and a 3-tuple in an information element of said header.

10. The network node according to claim 8, wherein said predetermined amount of data is set individually for the respective sub-flow queues.

11. The network node according to claim 8, wherein said network node is additionally operative to prioritize sub-flow queues comprising packets of small sizes or packets that are sparse in their nature.

12. The network node according to claim 8, wherein said network node is additionally operative to provide new sub-flow queues when new sub-flows occur and to remove empty sub-flow queues by picking a queue from a common pool of queues and to perform said removing of empty sub-flow queues by returning an empty sub-flow queue to said common pool of queues.

13. The network node according to claim 8, wherein the network node comprises an LTE network node.

14. The network node according to claim 13, wherein the LTE network node comprises an eNodeB.

15. A network node configured for operation in a communication network and comprising:
a receiving module for receiving incoming DL packets;
a classifying module for classifying said received DL packets in sub-flows, based on information being available in a header of respective said received DL packet;
a queuing module for queuing the DL packets of each sub-flow in a respective sub-flow queue;
a prioritizing module for prioritizing a sub-flow queue from which no downlink packets yet have been extracted;
an extracting module for extracting downlink packets from said sub-flow queues into a common outgoing flow;

said extracting downlink packets is made in a basic Round Robin fashion, assigning an indicator of last service occasion to each sub-flow queue when an extraction of downlink packets from the respective sub-flow queue has been completed, and selecting, when no prioritized sub-flow queues are present, the sub-flow queue with the earliest last service occasion for a next extraction, and when a prioritized sub-flow queue is present, said prioritized sub-flow queue;

said extracting downlink packets from the respective sub-flow queue is considered to have been completed when a predetermined amount of data has been extracted from said respective sub-flow queue; and a sending module for sending said downlink packets of the common outgoing flow, wherein operations of said network node are implemented in a PDCP layer operative to:
compute a temporal downlink throughput;
estimate, based on said temporal downlink throughput, a number of PDCP-PDUs necessary for keeping a RLC SDU buffer at a buffer target value, said buffer target value assuring a full utilization of available resource blocks;
preprocess said estimated number of PDCP-PDUs; and
put said preprocessed PDCP-PDUs in said RLC SDU buffer.

16. A non-transitory computer-readable medium storing a computer program comprising program code that, when executed by a processing circuitry of a communication node configured for operation in a wireless communication network, configures the communication node to:
receive incoming downlink packets;
classify said received downlink packets in sub-flows, based on information being available in a header of respective said received downlink packet;
queue said downlink packets of each sub-flow in a respective sub-flow queue;
extract downlink packets from said sub-flow queues into a common outgoing flow;
prioritize a sub-flow queue from which no downlink packets yet have been extracted;
said extracting of downlink packets is made in a basic Round Robin fashion, assigning an indicator of last service occasion to each sub-flow queue when an extraction of downlink packets from the respective sub-flow queue has been completed, and selecting, when no prioritized sub-flow queues are present, the sub-flow queue with the earliest last service occasion for a next extraction, and when a prioritized sub-flow queue is present, said prioritized sub-flow queue;
said extracting of downlink packets from the respective sub-flow queue is considered to have been completed when a predetermined amount of data has been extracted from said respective sub-flow queue; and
send said downlink packets of said common outgoing flow,
wherein operations of said network node are implemented in a PDCP layer operative to:
compute a temporal downlink throughput;
estimate, based on said temporal downlink throughput, a number of PDCP-PDUs necessary for keeping a RLC SDU buffer at a buffer target value, said buffer target value assuring a full utilization of available resource blocks;
preprocess said estimated number of PDCP-PDUs; and
put said preprocessed PDCP-PDUs in said RLC SDU buffer.

\* \* \* \* \*